Figure 1:
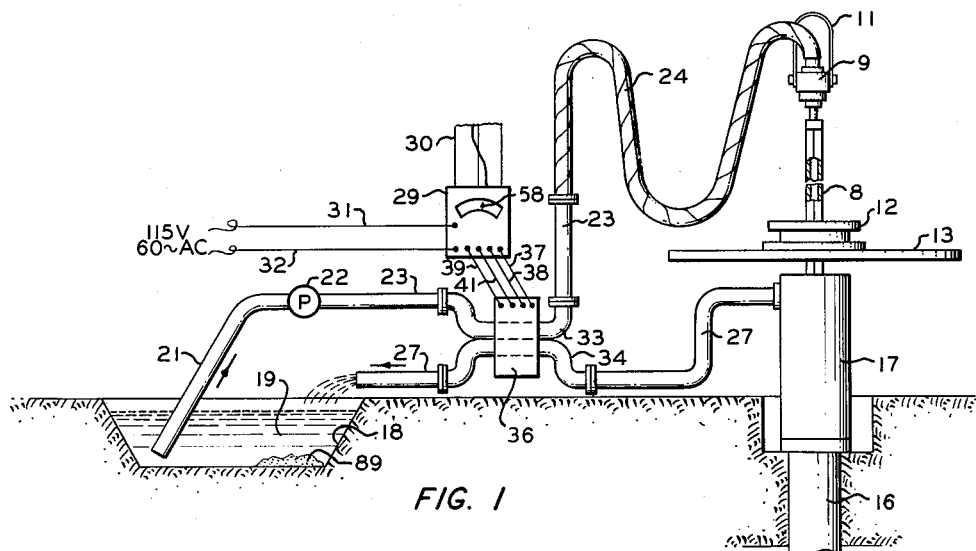

Oct. 3, 1961 — J. R. HURLEY — 3,002,379
PROCESS AND APPARATUS FOR MAGNETIC FLOW MEASUREMENT
Filed Dec. 19, 1958 — 2 Sheets-Sheet 1

INVENTOR.
J. R. HURLEY
BY Hudson & Young
ATTORNEYS

INVENTOR.
J.R. HURLEY

United States Patent Office

3,002,379
Patented Oct. 3, 1961

3,002,379
PROCESS AND APPARATUS FOR MAGNETIC FLOW MEASUREMENT
James R. Hurley, Milwaukee, Wis., assignor to Phillips Petroleum Company, a corporation of Delaware
Filed Dec. 19, 1958, Ser. No. 781,616
6 Claims. (Cl. 73—155)

This invention relates to magnetic flow measurement apparatus and to processes employing the same. In one aspect, it relates to a process employing said apparatus to detect the loss of drilling mud to the formations penetrated by a well during drilling the same, or to detect the entry of fluids from said formations into said well when their pressure in said formation becomes excessive. In another aspect, it relates to measuring the rate of flow of well drilling mud.

In the prior art there has been great difficulty in obtaining an indication of the differential flow rate between liquid going to a zone and liquid returning from said zone. While obviously this problem occurs in other processes in which liquid may be gained, or lost, in such a zone, the most difficult form of this problem has been in drilling wells by the rotary drilling process, in which a liquid drilling mud is forced down into a well to cool the bit and returns transporting the drilling cuttings with it. If mud is being pumped down the well faster than it returns, it is obviously being lost to some permeable formation in the well, which is bad because of the cost of the lost drilling mud and also the possible contamination and plugging of oil-bearing formations with mud so that they will not produce oil as expected. If the volume of mud is increasing by fluids entering the well from a permeable formation, a very dangerous situation exists, as all the mud and drilling tools may soon be blown out of the well, right out through the top of the derrick, without any further appreciable warning, possibly killing one or more of the drilling crew, and often causing the loss of the well or causing a fire that is very hard to control.

It is therefore of the utmost importance that small differences in flow rate in and out of the oil well be detected and indicated immediately.

Drilling mud is difficult to meter accurately, due to suspended solids which tend to deposit and build up a cake at any obstruction in a pipe, which deposit soon makes the usual orifice flowmeters inoperative, but the present invention overcomes this by employing a smooth pipe in a magnetic flowmeter, and achieves the differential flow reading desired by passing two such smooth pipes through the same magnetic field in the flowmeter, whereby a single electrical signal is transduced, thus avoiding any complicated mechanical or electrical linkage of two independent flowmeters with its resultant time lag and chance of failure without warning. The present invention also avoids the inherent errors of the devices of the prior art by having a single electrical circuit pass in series through said two pipes in the same magnetic field, so that any defect in electrical voltage supply, and small frequency changes in the electrical supply, which would make an erroneous reading in one pipe are completely compensated for in the other pipe; whereas if separate flowmeters are employed the errors that might occur in one would not be compensated for in the other, and an erroneous differential flow rate would be indicated before the error was discovered. Another advantage of the present invention is that momentary changes in the differential flow rate are continuously indicated, so that the earliest possible warning of impending danger is always available.

One object of the present invention is to provide an improved magnetic differential flowmeter apparatus and method of using the same.

Another object is to provide an apparatus and method of measuring the rate of flow of drilling mud which deposits solids and renders orifice type flowmeters inaccurate.

Another object is to provide a complete rotary well drilling system comprising said magnetic differential flowmeter.

Another object is to provide a process of indicating differential flow with a magnetic flowmeter which is free of noncompensated errors due to irregular voltage and/or small frequency changes in the electricity supplied to the well drilling site.

Other objects are to provide simple and relatively inexpensive flowmeter construction in which there is no special linking of separate flowmeters beyond the primary transducer.

Numerous other objects and advantages will be obvious to those skilled in the art upon reading the accompanying specification, claims, and drawings.

Figure 3:
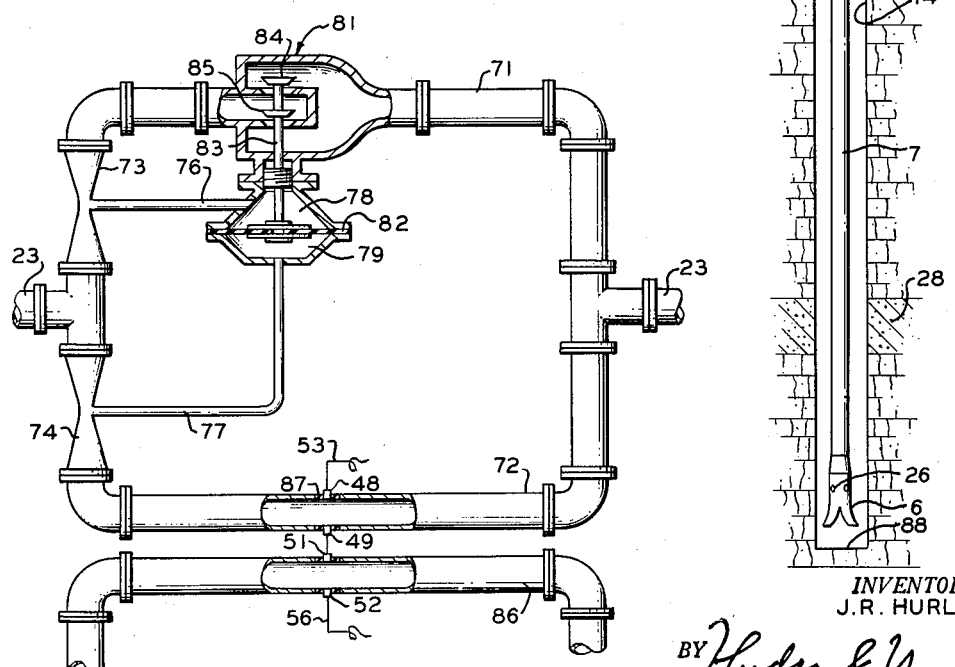
Figure 2:
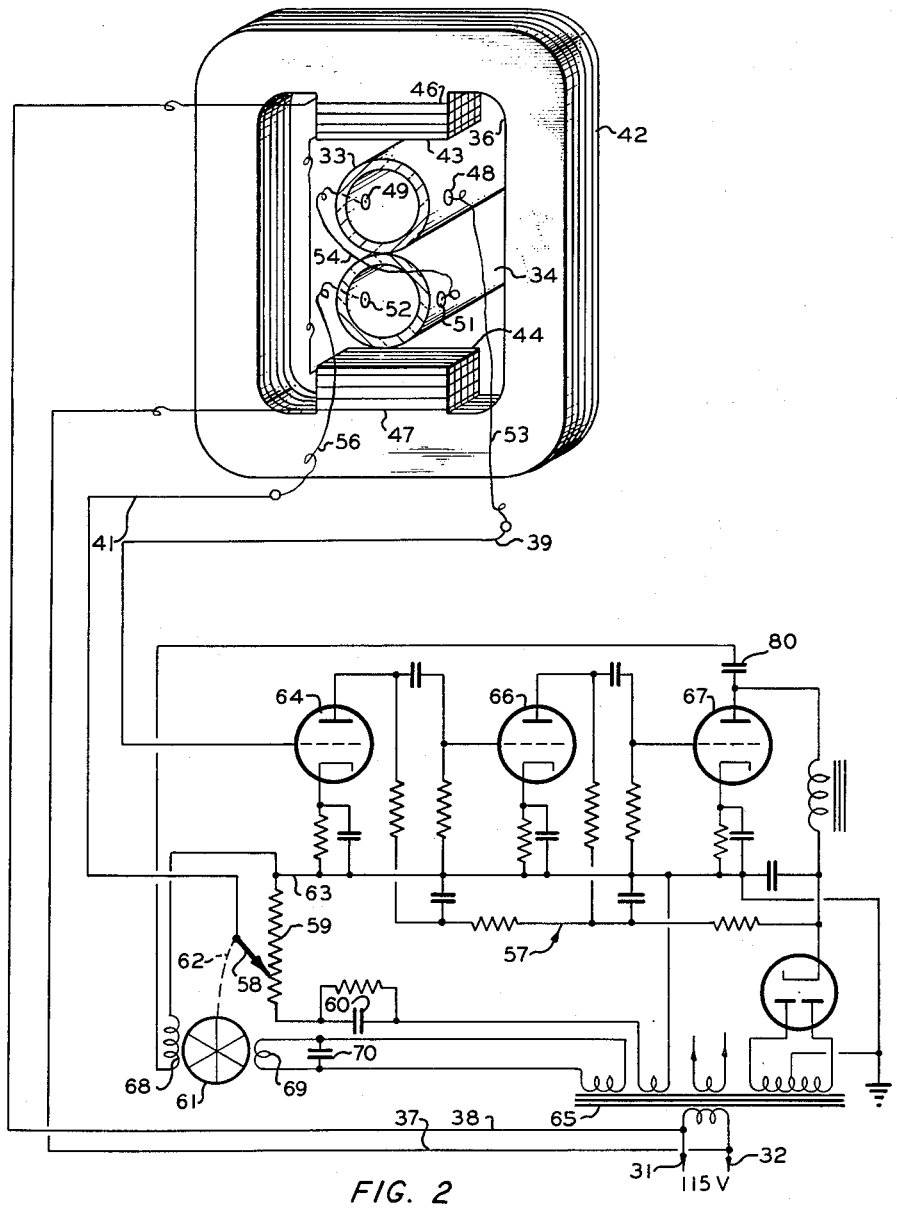

In the drawings:
FIGURE 1 is a diagrammatic elevational view of a well drilling rig embodying the present invention, with the earth in cross section to show the well and mud pit.
FIGURE 2 is an electrical circuit drawing showing the preferred wiring of the magnetic differential flowmeter included in the combination shown in FIGURE 1.
FIGURE 3 is an elevational view with parts broken away of a proportional flow splitting apparatus that may be substituted for a portion of the pipes around the flowmeter in FIGURE 1 to form a second species of the invention in which it is not necessary that all of the flow go through the flowmeter, but only a proportional part thereof.

Magnetic flowmeters based on Faraday's Law of Induction have been known for a number of years. According to this law, a conductor moving relative to a magnetic field has induced across it a voltage proportional to the velocity of movement as defined by the relationship:

$$E = Blv \times 10^{-8}$$

where E is the induced voltage in volts, B is the flux density in gauss, $l$ is the length of the conductor in centimeters, and $v$ is the velocity of the conductor in centimeters per second. The directions of $v$, $l$ and B are mutually generally perpendicular. A flowmeter based upon this principle comprises, in its simplest form, a conduit disposed in a magnetic field so that the direction of flow of a conductive fluid through the conduit is generally at right angles to the magnetic field. The conduit normally is constructed of a nonconductive, nonmagnetic material. The motion of the liquid through the conduit causes a voltage to be induced in the liquid which is proportional to its velocity. A pair of electrodes are embedded in the walls of the conduit on an axis generally mutually perpendicular to the axis of flow and the axis of the magnetic field so as to make electrical contact with the flowing liquid. The voltage induced in the liquid is thus transferred to these electrodes. The voltage between the electrodes is measured to provide a signal representative of the flow rate.

By "generally perpendicular" it is meant that the perpendicular component of the forces do the work, and the directions $v$, $l$ and B need not be perpendicular if there is some substantial component of force that is perpendicular. However, the farther from perpendicular they are, the weaker the forces, so there is no reason to depart from exact perpendicularity except for possible design considerations, as obviously the perpendicular component is equal to the total force times the cosine of the angle of departure from the perpendicular, and such changes are within the scope of the present invention.

The magnetic field established across the conduit can be either alternating or direct. If a direct magnetic field is employed, the output signal is a direct current signal; and the output signal is an alternating signal if an alternating magnetic field is provided. Alternating magnetic fields are generally employed because it is much easier to measure and amplify small amplitude alternating voltages than small amplitude direct voltages. The use of an alternating magnetic field also eliminates the effect of polarization of the electrodes.

However, no differential flow measurement is shown in the prior art of magnetic flowmeters, nor any magnetic flow measurement of liquid well drilling mud.

In FIGURE 1, as an illustrative embodiment, the invention is shown applied to a conventional rotary oil well drilling rig. Obviously, it could also be employed in any two pipes leading to and from a well, or to and from any other zone to which fluid is being pumped and returned, with fluid added or subtracted in said zone due to any cause, to measure and indicate the added or subtracted fluid flow.

The conventional rotary well drilling rig comprises a drill bit 6 mounted on a drill string 7 consisting of connected pipes, one of which is noncircular in cross section and is known as a kelly 8, the drill string being supported from a derrick (not shown) by a rotary swivel 9 and bail 11 while the kelly 8, drill string 7, and bit 6 are rotated by a rotary table 12 mounted on the floor 13 of said derrick. Table 12 is rotated about its vertical axis by conventional means (not shown) and has a noncircular opening along said axis corresponding to, and rotationally driving, kelly 8, but allowing free vertical movement thereof as bail 11 is hoisted or lowered. It is customary to provide the well 14 with a lining such as casing 16, which is generally provided with a casing head 17. In order to cool bit 6 and to remove cuttings from the well 14, it is customary to provide a drilling mud pit 18 containing a suitable liquid drilling mud 19, and pump this mud through pump intake pipe 21, pump 22, line 23 (including nonmagnetic portion 33 and flexible portion 24) through rotary swivel 9, kelly 8, drill string 7, out openings 26 in bit 6, up the annual space between drill string 7 and the wall 14 of the well, through casing 16, casing head 17, and out mud discharge pipe 27 (including nonmagnetic portion 34) into the drilling mud pit 18.

As pointed out above, it is very important to know of any differences in the rate of flow of the drilling mud entering through pipe 21 and the drilling mud returning through pipe 27. If less mud is returning through pipe 27, obviously the mud is being lost into a permeable formation 28. This results in an economic loss as drilling mud is relatively expensive; and if permeable formation 28 is the formation from which oil production is expected, the drilling mud penetrating the same may filter out a deposit of solid mud in the formation which will reduce or completely prevent the production of oil when the well is completed. In addition to the deposit of solid mud in formation 28, if the drilling mud has an aqueous base, or contains considerable water in emulsion form, and the permeable formation 28 contains bentonitic clays or other materials which absorb water and expand, formation 28 may seal and plug itself completely. Therefore, it is important to know immediately when drilling mud is being lost to formation 28.

On the other hand, if more drilling mud is returning through pipe 27 than entered pipe 21, obviously fluid is being added to the well from the permeable formation 28. This fluid often comprises gas under high pressure which tends to empty the liquid out of well 14 in a progressively increasing manner. As the liquid is driven out of well 14 through pipe 27 faster than it comes in pipe 21, the hydrostatic head of liquid acting to resist entry of fluid from formation 28 is progressively reduced and the rate at which gas enters from formation 28 progressively increases. The pressure in formation 28 may be enough to blow the entire drill string 7 right out through the rotary table 12 and the top of the derrick (not shown), which may result in the death of an operator, a fire that is difficult to control, or loss of the well.

The present invention makes a continuous indication of the differential rate of flow of drilling mud in pipes 33 and 34 on the dial of instrument 29, which may also make a record on moving paper 30. Instrument 29 is supplied with the conventional 115 volt, 60 cycle alternating current, generally available, through electrical supply lines 31 and 32. Of course, instrument 29 can be designed to operate with other voltages and frequencies, but surprisingly it has been found that considerable differences in line voltage, fluid temperature, and conductivity of the fluid can occur without increasing the error of the instrument to a point where it would be insensitive to indicating an undesirable rate of flow to or from permeable formation 28, as shown by the data in Table I below. While the instrument is more sensitive to changes in frequency, such frequency changes rarely occur in modern commercial alternating current electrical supply systems, and so far as differential measurement is concerned any error of measurement in pipe 33 due to frequency changes is largely compensated for by similar changes in measurement in pipe 34 in the same A.C. magnetic field.

In order for instrument 29 to measure the velocity of the drilling mud, a nonconducting, nonmagnetic pipe 33 forms a portion of line 23 and a similar pipe forms a portion of line 27. Lines 33 and 34 pass through the same magnetic field created by magnet 36 which is preferably an electromagnet energized with alternating current from lines 37 and 38. Magnet 36 in combination with coils 46 and 47 and related parts thus acts as a transducer producing an electrical signal on lines 39 and 41 to instrument 29, as will be explained more fully with reference to the wiring diagram in FIGURE 2.

In FIGURE 2 the magnet 36 is shown composed of conventional laminated plates 42 having pole portions 43 and 44 around which are solenoid windings 46 and 47, respectively. While the construction described is that preferred, it is obvious that other electrical and magnetic construction known to be equivalent in the electromagnetic art, including electrical motors and generators, can be employed without departing from the scope of the present invention. In the preferred embodiment of FIGURE 2, solenoid windings 46 and 47 are in series with wires 37 and 38 connected in parallel across the electrical supply wires 31 and 32, and the windings 46 and 47 on pole pieces 43 and 44 are made in the same direction so that poles 43 and 44 will be opposite magnetic poles as they alternate between north and south poles with the frequency of the current. The shape of the magnet 36 is such that a substantially uniform magnetic field is created having a direction substantially vertical in the figure between poles 43 and 44.

The drilling mud pipes 33 and 34, which are preferably made of an electrical nonconductive, nonmagnetic material, such as glass, pass between poles 43 and 44 with their axes at right angles to the magnetic field. In the walls of pipes 33 and 34 are mounted electrically conductive electrodes 48 and 49, 51 and 52, and the shortest distance between electrodes 48 and 49, 51 and 52, respectively, lie on lines lying at right angles to both the axes of pipes 33 and 34 and the magnetic field between poles 43 and 44. As shown in FIGURES 1 and 2, the flow of drilling mud through pipe 33 is in the opposite direction from its flow in pipe 34; and therefore, to have the potential produced between electrodes 48 and 49 in the opposite direction to the potential produced between the electrodes 51 and 52, it is necessary to connect the wire 39 to electrode 48, electrode 49 to electrode 51, and electrode 52 to wire 41. The major portions of intermediate connecting wires 53, 54, and 56 are outside the major field of magnetic force between poles 43 and 44, the terminal portions extending to and from the electrodes in entering and leaving the magnetic field along lines parallel to the axes of pipes 33 and 34. Conventional electrical shielding may be applied to such parts of wires 39, 41, 53, 54, and 56 as desired.

So far as the liquid connections are concerned, it is generally most convenient to have the liquid pass in opposite directions in pipes 33 and 34. It should be realized, however, that it is possible to arrange the piping so that the liquid would pass in the same direction in pipes 33 and 34, in which case the electrical connection would be varied so that lead 54 would connect electrodes 49 and 52 and wire 56 would be connected to electrode 51 (not shown). The results would obviously be the same as when connected in the preferred arrangement of FIGURE 2 with oppositely moving streams of drilling mud in pipes 33 and 34.

Connected to wires 39 and 41 is any suitable indicating circuit known to the prior art and generally designated as 57. Essentially indicating circuit 57 is a low range A.C. millivoltmeter. The position of slider 58 on potentiometer 59 as the instrument balances itself is the measure of the differential flow of the liquids in pipes 33 and 34. The position of 58 may be observed through a suitable window in instrument case 29, as shown in FIGURE 1. If a record is desired, a conventional pen (not shown) can be attached to arm 58, and a sheet of paper 30 (see FIGURE 1) moved relative thereto by clockwork (not shown) to provide a conventional time-voltage record. If desired, the paper can be marked off in units of time and gallons per minute (not shown). Slider 58 is moved up and down potentiometer 59 by means of the rotor 61 of a two-phase balancing motor 61 of conventional construction, which drives arm 58 by means of shaft 62 indicated in dotted lines. The resulting voltage between wire 39 and ground 63 is amplified by a suitable amplifier which may comprise three stages of amplification 64, 66, and 67, and the amplified output is supplied to one winding 68 of the two-phase motor 61, the other winding 69 being connected to a suitable constant A.C. power supply 65 of conventional construction which receives power from electrical wires 31 and 32. The motor rotor 61 acts as servo means to move in response to the current in motor windings 68 and 69 to rotate and drive slider 58 on potentiometer 59 so as to pick off a voltage from potentiometer 59 between 58 and 63 (which voltage is any fraction of that across resistance 59) to oppose and reduce the voltage between wire 39 and ground 63 to zero, at which time the rotor 61 ceases to move and the position of slider 58 indicates the magnitude and direction of the excess in rate of flow in one of pipes 33 or 34 over that in the other. Condensers 60, 70, and 80 are supplied in the circuit where needed so that the voltages being compared are in proper phase.

Instead of the A.C. system shown, a permanent magnet or a direct current induced magnet (neither shown) can be substituted for magnet 36 and A.C. coils 46 and 47. In that case the signal potential across wires 39 and 41 would be a direct potential and a low range D.C. millivoltmeter (of any well known design) would be substituted for the A.C. millivoltmeter 57 shown in FIGURE 2. However, the A.C. system disclosed is preferred because it is easier to measure and amplify small amplitude alternating current voltages, and polarization of the electrodes, along with corrosion and deposit problems, is avoided.

In order to reduce the size of the instrument when large rates of fluid flow are involved, it is often desirable to only pass a proportional part of the flow through the magnetic flowmeter. In such instances the construction of FIGURE 3 may be employed. In FIGURE 3 two pipes 71 and 72 are connected in parallel as a portion of conduit 23. In pipe 71 there is a venturi 73 and in pipe 72 there is a venturi 74. By making venturies 73 and 74 identical, identical pressures will be created in pipes 76 and 77 by identical rates of flow through the venturies; or if desired, by making venturi 73 less constricted than venturi 74, a proportionally greater flow will occur in venturi 73 than 74 to produce the same pressure in lines 76 and 77.

Lines 76 and 77 are connected in communication with two opposite chambers 78 and 79 of a motor valve generally designated as 81, which chambers are separated by flexible diaphragm 82 connected by valve operating rod 83 to a valve which preferably is a balanced valve having valve heads 84 and 85 moving to and from their respective seats. It is believed obvious that as the flow varies in pipe 23 that the desired portion of this flow will always be carried by pipe 72 which passes through the magnet 36 along with pipe 86. Obviously, pipe 86 is connected in line 27 in the same manner that pipe 72 is connected in line 23, so that the lower portion of FIGURE 3 which has been broken away will be a mirror image of the upper portion, including a valve like 81 (not shown). It has been found that pipes 72 and 86 can be made out of nonmagnetic metal for strength, such as brass, provided a suitable annular washer 87 of electrically nonconducting, nonmagnetic material, such as natural or synthetic rubber, is inserted in pipes surrounding the electrodes 48—52. In order to obtain differential measurement in FIGURE 3, it is obvious that the liquid should flow in opposite directions in pipes 72 and 86, and that the magnetic field should be perpendicular to the plane of the drawing and be of equal strength between electrodes 48 and 29 and electrodes 51 and 52.

When the present invention was first suggested for use in measuring drilling mud, those skilled in the art pointed out that due to the addition of cuttings made from the earth 88 at the bottom of well 14 by bit 6, that the composition of the returning mud 27 would not be exactly the same as the mud 21 because there is some gravitational separation of sediment 89 in the slowly moving mud in the enlarged mud pit 18 before the mud 19 is sucked into pump intake 21. Surprisingly, this has not proved to have a significant effect, as it was found upon making actual tests on liquids with different electrical conductivities and temperatures, and with different line voltages applied to wires 31 and 32, that the error was generally less than 2 percent, as shown in Table I. Variations in line voltage were found to have very little effect on the accuracy or calibration of the flowmeter providing the voltage was above about 85 volts. The effect of the temperature variation is small enough to allow for some heating which may occur naturally in a deep well, although this temperature change is reduced by the cooling effect of the atmosphere on pipe 27. If desired, pipe 27 can be cooled by suitable indirect heat exchange with the liquid in pipe 21 (not shown) before passing through magnet 36, but this is considered unnecessary for the purpose of having instrument 29 indicate significant loss or gain of fluid from the permeable formation 28. This magnetic flowmeter was found to be insensitive to variations in fluid properties provided that the specific fluid electrical conductivity was above 30 micromhos per centimeter, and provided that any nonconducting drilling cuttings in the stream are particles small in comparison to the pipe diameter. The condutcivity of drilling mud is always above 50 micromhos per centimeter and the cuttings are always small in comparison with any pipe carrying a substantial portion of the drilling mud, as any large particle leaving bit 6 will be crushed by drill stem 7 against the walls of the well 14 as it rises.

The data in Table I was obtained using a single phase magnetic flowmeter; that is, in FIGURE 2, pipe 34 was absent and wire 39 was connected to electrode 48 and electrode 49 was connected to wire 41. Aqueous solutions with electrical conductivities, respectively, of 150 and 1650 micromhos per centimeter were used in the runs 1–5, some of which were varied as to line voltage and fluid temperature as indicated. The true flow rate was determined by measuring with a stop watch the time required to empty a 39-gallon barrel and the rate of flow indicated was a calibrated reading of the position of indicator 58. From the true and indicated flow rates the error is calculated as a percentage.

TABLE I

*Test of single pass magnetic flowmeter*

| Run No. | Line Voltage, Volts | Fliud Temp., °F. | Conduct of Fluid, μMho | Flow Rate | | |
|---|---|---|---|---|---|---|
| | | | | Indicated, gals. p.m. | True, gals. p.m. | Error, percent |
| 1 | 117 | 72 | 150 | 47.4 | 47.96 | 1.17 |
| 2 | 117 | 72 | 1,650 | 47.4 | 47.9 | 1.04 |
| 3 | 105 | 76 | 150 | 32.7 | 33.25 | 1.65 |
| 4 | 130 | 78 | 150 | 32.5 | 33.25 | 2.25 |
| 5 | 117 | 70 | 1,650 | 47.4 | 47.6 | 0.4 |

A problem of the prior art in measuring rates of flow of drilling mud through the conventional orifice flowmeter used for measuring other liquids is that the drilling mud tends to deposit clay around the restriction of the orifice, soon spoiling the hydraulic characteristics of the restriction and thereby rendering the reading erroneous. In the present invention, by maintaining the diameter of pipes 33 and 34 or 72 and 86 constant, it has been found that substantially no deposit occurs and that the accuracy of the magnetic flowmeter does not deteriorate during use because of such deposits. In view of the fact that the returning drilling mud is of slightly different composition, due to cuttings made by bit 6, and that the drilling mud renders prior art flowmeters such as orifice meters inaccurate due to deposits, it is regarded as unexpected that a magnetic flowmeter could be applied to the measurement of drilling muds. It is also regarded as unexpected that by merely connecting the electrodes 48, 59, 51, and 52 in proper relation that a single transducer comprising magnet 36 would be produced that would make a differential measurement in the rate of flow of the mud going to the well and returning from the same without the necessity of employing any mechanical or electrical differential device or electrical differential circuit at any point beyond the magnet 36.

While its specific embodiment has been shown in the drawings for illustrative purposes, it is believed the invention is not limited thereto. In other applications of the invention well 14 may be replaced by any zone to which a liquid is pumped and from which it returns, in which zone there may be a variable addition of liquid to or removal of liquid from the circulating liquid. As such the invention may be used to detect leaks, to measure the amount of fluid being injected into the formation, and for other purposes which will be obvious to those skilled in the art of flow measurement.

Having described my invention, I claim:

1. A magnetic differential fluid flowmeter for indicating the difference in rate of fluid flow between the fluid flows in two conduits comprising in combination a magnet having two opposite magnetic poles, means to energize said poles comprising a source of alternating electric current and a circuit adjacent said magnet and electrically connected across said source to establish a magnetic field generally along an axis between said poles, a transducer comprising a first fluid conduit disposed with its axis passing through said field generally perpendicular thereto, a first pair of electrodes in said first fluid conduit in contact with the fluid flowing therein and spaced therein along an axis generally perpendicular to said magnetic field and generally perpendicular to the axis of said first conduit, a second fluid conduit disposed with its axis passing through said field generally perpendicular thereto, a second pair of electrodes in said second fluid conduit in contact with the fluid flowing therein and spaced therein along an axis generally perpendicular to said magentic field and generally perpendicular to the axis of said second conduit, an electrical signal potential producing circuit connecting the exterior ends of said first and second pairs of electrodes in series so that the resulting electrical potentials appearing across them are opposed, and their difference appears as said signal potential across said signal potential producing circuit, and means to indicate the magnitude and sign of said signal potential comprising servo means to balance out said signal potential in moving to a position indicating said magnitude and sign.

2. A magnetic differential fluid flowmeter for indicating the difference in rate of fluid flow between the fluid flows in two conduits comprising in combination a magnet having two opposite magnetic poles to establish a magnetic field generally along an axis between said poles, a transducer comprising a first fluid conduit disposed with its axis passing through said field generally perpendicular thereto, a first pair of electrodes in said first fluid conduit in contact with the fluid flowing therein and spaced therein along an axis generally perpendicular to said magnetic field and generally perpendicular to the axis of said first conduit, a second fluid conduit disposed with its axis passing through said field generally perpendicular thereto, a second pair of electrodes in said second fluid conduit in contact with the fluid flowing therein and spaced therein along an axis generally perpendicular to said magnetic field and generally perpendicular to the axis of said second conduit, an electrical signal potential producing circuit connecting the exterior ends of said first and second pairs of electrodes in series so that the resulting electrical potentials appearing across them are opposed, and their difference appears as said signal potential across said signal potential producing circuit, and means to indicate the magnitude and sign of said signal potential.

3. A magnetic differential fluid flowmeter for indicating the difference in rate of fluid flow between the fluid flows in two conduits comprising in combination a magnet having two opposite magnetic poles, means to energize said poles comprising a source of alternating electric current and a circuit adjacent said magnet and electrically connected across said source to establish a magnetic field generally along an axis between said poles, a transducer comprising a first fluid conduit disposed with its axis passing through said field generally perpendicular thereto, a first pair of electrodes in said first fluid conduit in contact with the fluid flowing therein and spaced therein along an axis generally perpendicular to said magnetic field and generally perpendicular to the axis of said first conduit, a second fluid conduit disposed with its axis passing through said field generally perpendicular thereto, a second pair of electrodes in said second fluid conduit in contact with the fluid flowing therein and spaced therein along an axis generally perpendicular to said magnetic field and generally perpendicular to the axis of said second conduit, and an electrical signal potential producing circuit connecting the exterior ends of said first and second pairs of electrodes in series so that the resulting electrical potentials appearing across them are opposed, and their difference appears as said signal potential across said signal potential producing circuit.

4. A magnetic differential fluid flowmeter for indicating the difference in rate of fluid flow between the fluid flows in two conduits comprising in combination a magnet having two opposite magnetic poles to establish a magnetic field generally along an axis between said poles, a transducer comprising a first fluid conduit disposed with its axis passing through said field generally perpendicular thereto, a first pair of electrodes in said first fluid conduit in contact with the fluid flowing therein and spaced therein along an axis generally perpendicular to said magnetic field and generally perpendicular to the axis of said first conduit, a second fluid conduit disposed with its axis passing through said field generally perpendicular thereto, a second pair of electrodes in said second fluid conduit in contact with the fluid flowing therein and spaced therein along an axis generally perpendicular to said magnetic field and generally perpendicular to the axis of said second conduit, and an electrical signal potential producing circuit connecting the exterior ends of said first and second pairs of electrodes in series so that the resulting electrical potentials appearing across them are opposed, and their difference appears as said signal potential across said signal potential producing circuit.

5. A magnetic differential fluid flowmeter for indicating the difference in rate of inflow and outflow of well drilling fluids being circulated through a well comprising exposed earth formations comprising in combination a magnet having two opposite magnetic poles, means to energize said poles comprising a source of alternating electric current and a circuit adjacent said magnet and electrically connected across said source to establish a magnetic field generally along an axis between said poles, a transducer comprising a first fluid conduit disposed and connected to transmit a predetermined proportion of the inflow of said fluids into said well and disposed with its axis passing through said field generally perpendicular thereto, a first pair of electrodes in said first fluid conduit in contact with the fluid flowing therein and spaced therein along an axis generally perpendicular to said magnetic field and generally perpendicular to the axis of said first conduit, a second fluid conduit disposed and connected to transmit said predetermined proportion of the outflow of said fluids from said well and disposed with its axis passing through said field generally perpendicular thereto, a second pair of electrodes in said second fluid conduit in contact with the fluid flowing therein and spaced therein along an axis generally perpendicular to said magnetic field and generally perpendicular to the axis of said second conduit, an electrical signal potential producing circuit connecting the exterior ends of said first and second pairs of electrodes in series so that the resulting electrical potentials appearing across them are opposed, and their difference appears as said signal potential across said signal potential producing circuit, and means to indicate the magnitude and sign of said signal potential comprising servo means to balance out said signal potential in moving to a position indicating said magnitude and sign.

6. A magnetic differential fluid flowmeter for indicating the difference in rate of inflow and outflow of well drilling fluids being circulated through a well comprising exposed earth formations comprising in combination a magnet having two opposite magnetic poles to establish a magnetic field generally along an axis between said poles, a transducer comprising a first fluid conduit disposed and connected to transmit a predetermined proportion of the inflow of said fluids into said well and disposed with its axis passing through said field generally perpendicular thereto, a first pair of electrodes in said first fluid conduit in contact with the fluid flowing therein and spaced therein along an axis generally perpendicular to said magnetic field and generally perpendicular to the axis of said first conduit, a second fluid conduit disposed and connected to transmit said predetermined proportion of the outflow of said fluids from said well and disposed with its axis passing through said field generally perpendicular thereto, a second pair of electrodes in said second fluid conduit in contact with the fluid flowing therein and spaced therein along an axis generally perpendicular to said magnetic field and generally perpendicular to the axis of said second conduit, an electrical signal potential producing circuit connecting the exterior ends of said first and second pairs of electrodes in series so that the resulting electrical potentials appearing across them are opposed, and their difference appears as said signal potential across said signal potential producing circuit, and means to indicate the magnitude and sign of said signal potential.

References Cited in the file of this patent

UNITED STATES PATENTS

| | | |
|---|---|---|
| 2,149,847 | Kolin | Mar. 7, 1939 |
| 2,290,408 | Crites | July 21, 1942 |
| 2,637,207 | De Boisblanc | May 5, 1953 |
| 2,739,120 | Fischer | Mar. 20, 1956 |
| 2,896,656 | Allen et al. | July 28, 1959 |